2,930,700
Patented Mar. 29, 1960

2,930,700
PROCESS FOR IMPROVING THE FLAVOR OF SOY FLOUR

Richard W. Bradof, West Chicago, Ill., assignor to The Wander Company, Chicago, Ill., a corporation of Delaware No Drawing. Application November 1, 1957
Serial No. 693,799

17 Claims. (Cl. 99—99)

This application is a continuation-in-part of my copending application Serial No. 577,644, filed April 12, 1956, now abandoned.

This invention relates to improvements in the treatment of soy bean material, particularly soy flour, for eliminating the undesirable taste or flavor which is characteristic of soy products.

Soy flour or meal is known to be one of the least expensive sources of food grade vegetable protein. In fact, solvent extracted soy flour contains as much as 50% protein of high biological value. However, soy flour has never been used successfully as a major ingredient of food products because of its characteristic bitter and beany flavor. Various techniques, including both physical and chemical treatment, have been proposed by others in the art to minimize this inherently objectionable soy flour, but such suggestions have met with only limited success at best so that the flavor problem continues to be a major deterrent to the widespread use of soy flour.

Accordingly, a primary object of the present invention is to provide a novel and improved method of treating soy bean material to overcome its inherently objectionable flavor.

A further object of the invention is to provide a commercially practical and relatively inexpensive means for removing the characteristic bitter and beany flavor of soy flour.

Another object of the invention is to provide a novel and improved treatment for soy flour which permits the treated soy flour to be used as a major ingredient of food products without encountering objectionable flavor characteristics.

The term soy flour as used herein refers to the granules, flakes, or other small particle size material which is obtained by dehulling whole soy beans, crushing or grinding, and then removing a substantial portion of the fat content by solvent extraction with an organic solvent such as hexane, benzene, carbon tetrachloride, or the like. The unpleasant bitter or beany flavor which is associated with soy bean products including soy flour or meals is believed by some investigators to be caused by the presence of certain oxygen-containing organic compounds such as aldehydes and ketones, and perhaps even esters, acids, and phenols, which are not entirely removed by ordinary solvent extraction treatment. The present invention involves a method of treating the soy flour under controlled conditions such that the undesirable flavor components are removed or rendered innocuous while the valuable protein content of the soy flour remains substantially unchanged.

Broadly speaking, the flavor improving treatment of the present invention involves subjecting the soy flour in aqueous medium to the action of yeast. Preferably, the yeast is utilized together with an added oxidizing agent or a selected alkaline neutralizing agent or both. As hereinafter described in greater detail, the preferred mode of practicing the invention involves the use of all three reagents and in addition a preliminary treatment with a reducing agent, such as sodium bisulfite or sodium nitrite, and a final step to remove excess oxidizing agent. The process is carried out under controlled and relatively mild conditons of temperature and reaction time so as to effect the desired flavor improvement without obtaining alcoholic fermentation or protein degradation. Although the reasons for the success of the present flavor improvement treatment are not entirely understood, a reasonable hypothesis based on the available evidence is that the aldehydes and ketones or other organic materials responsible for bad flavor are oxidized, either by atmospheric oxygen or by the added oxidizing agent when the latter is used, under the catalytic influence of the enzyme content of the yeast to form organic acids having less objectionable organoleptic properties. Such organic acids are probably neutralized by reaction with the alkaline neutralizing agent when the latter is employed. In addition, the evidence indicates that yeast also produces other beneficial effects, particularly carbohydrate degradation or hydrolysis of the polysaccharide molecules in the soy flour. However, it is not intended that the invention be limited by this tentative theoretical explanation of the mechanism of the reactions which occur in the complex system involved.

Describing the invention now in greater detail, consideration will first be given to the materials and treating agents employed. In general, the conventional commercially available solvent extracted soy flour is used. Although the soy flour may be utilized in raw, cooked, or cooked and toasted form, taste evaluation tests have indicated a slight preference for the use of cooked soy flour.

Yeast is the key ingredient of the treating process of the present invention and its presence is essential. The complete role of yeast in the process is not thoroughly understood but extensive experiments and evaluations by panels of taste experts have shown beyond any doubt that flavor and other organoleptic properties of the soy flour are greatly improved by the yeast treatment. As hereinafter set forth in greater detail, the evidence indicates that the enzyme peroxidase in yeast is responsible in large measure for the elimination of the objectionable flavor of soy flour. Presumably, the peroxidase functions as an oxidation catalyst under the treating conditions to promote and facilitate oxidation of the undesirable flavor components to more tolerable forms. Moreover, the experimental data also show that the treatment with yeast results in a significant increase in reducing sugar content thereby indicating that a substantial change occurs in the carbohydrate fraction of the soy flour. This change is not due to alcoholic fermentation which would in fact decrease the reducing sugar content. Although soy flour contains no appreciable quantity of starch, it does contain pentosans which are long chain polysaccharide molecules. These molecules are readily hydrolyzed by the enzyme system of yeast resulting in the formation of mono-, di-, and trisaccharides. Subsequently, it is believed that these reducing sugars probably react with proteins in the soy flour, according to the well known browning reaction or melanoidin reaction, to form new acceptable flavor components which are not only desirable as such but are also strong enough to mask to a certain extent the objectionable flavors of soy flour. Thus, the yeast serves the dual purpose of promoting the oxidation and elimination of objectionable flavor components and also of promoting the formation of new desirable flavors.

Many different strains of yeast may be employed, but ordinary household yeast and brewers yeast have been found to be entirely suitable for purposes of the present invention. Although the amount of yeast employed is not particularly critical, it has been found that effective results can be obtained with as little as 0.5% by weight based on the weight of soy flour and no particular advantage is gained by exceeding about 8% by weight. Preferably, from about 2% to about 6% by weight of yeast should be used. Although yeast is the preferred treating material because of its availability and inexpensiveness, it is also within the scope of the invention to use other equivalent enzyme preparations which are edible, safe, and generally inoffensive in foods intended for human consumption.

For the oxidizing agent, most effective results are obtained with peroxide compounds, particularly inorganic peroxides such as hydrogen peroxide and sodium peroxide. In addition, certain of the peracids and their salts which contain oxygen in peroxide form, e.g. peracetic acid and potassium persulfate, may also be used with considerable effectiveness. Oxygen (either alone or in admixture with other gases such as in air) or ozone may also be used as the oxidizing agent. However, none of the various oxidizing agents are significantly more effective than hydrogen peroxide, and from the point of view of economy and maximum safety for food use, hydrogen peroxide is the oxidizing agent of choice. The commercially available 30% hydrogen peroxide is preferred. The amount of peroxide oxidizing agent employed, particularly hydrogen peroxide, may be from about 0.1% to about 1% by weight based on the weight of soy flour, and preferably from about 0.3% to about 0.7% by weight.

For the alkaline neutralizing agent used in the invention, the hydroxides and other compounds of sodium, potassium, ammonium, magnesium, and calcium have utility, but the ammonium, magnesium, and calcium compounds are preferred. The most suitable neutralizing agent from all considerations is ammonium hydroxide, but good results are also obtained using calcium oxide, calcium hydroxide, calcium carbonate, magnesium oxide, magnesium hydroxide, and magnesium carbonate. Mixtures of the foregoing calcium and magnesium compounds such as are found in the common commercial forms of hydrated limestone are also quite useful because of their cheapness and ready availability. A typical hydrated dolomitic limestone comprises a mixture of calcium and magnesium oxides together with calcium and magnesium carbonates and hydroxides. The amount of alkaline neutralizing agent required will, of course, depend to a large extent upon the particular agent selected. However, in every case the amount used should be sufficient to provide a pH of from about 6 to about 7.5 in the aqueous soy mixture or gruel being treated. When the pH is raised above about 7.5 there is frequently a danger of producing an objectionable off-flavor in the final product. In the case of the mildly alkaline calcium and magnesium compounds mentioned above, the amount of neutralizing agent which can be used with good results is usually from about 0.2% to about 1% by weight based on the weight of soy flour and, particularly in the case of commercial hydrated limestone, from about 0.3% to about 0.7% by weight.

As heretofore pointed out, yeast is the key treating agent of the process and significant flavor improvement is obtained by treatment with yeast alone or with yeast and an oxidizing agent or with yeast and a neutralizing agent. However, for realizing the full benefits of the invention all three treating agents are desirable, i.e. yeast, the oxidizing agent, and the neutralizing agent. Supplementing this basic treating or debittering technique, important additional benefits are obtained by preliminary treatment of the soy flour with a suitable reducing agent prior to being subjected to contact with yeast and the oxidizing agent. In accordance with the hypothesis previously advanced, it is believed that certain of the bitter flavor components of the soy flour are more resistant to oxidation than others and that they are rendered more susceptible to oxidation and subsequent neutralization if they are first subjected to the action of a reducing agent. Various reducing agents may be used provided that they do not adversely affect the edibility and safety of the ultimate soy flour product. Sulfur dioxide or compounds capable of releasing sulfur dioxide have been found to be quite useful, particularly sulfurous acid and various bisulfites such as sodium bisulfite. Sodium nitrite has also been found to be effective. In the case of sodium bisulfite the compound, in addition to its function as a reducing agent, may also react with various aldehydes or ketones which are present in the soy flour and which are responsible at least in part for the objectionable bitter flavor characteristics. Generally, the amount of bisulfite used must be limited so as to avoid imparting a biting or acidic taste to the treated product. A suitable quantity of sodium bisulfite, sodium nitrite, or the like is found to be from about 0.02% to about 0.1% by weight based on the weight of soy flour with a preferred range of from about 0.03% to about 0.08%.

In addition to the preliminary treatment with a reducing agent as described above, the preferred embodiment of the invention also includes a final step of decomposing or removing any excess peroxide compound, particularly hydrogen peroxide, which may remain in the mixture following the debittering treatment. This precaution is desirable in order to preclude the formation of oxidation products in the debittered soy flour during storage or subsequent processing of the soy flour to form food products such as breakfast foods, etc. The simplest and most effective way of removing hydrogen peroxide is by the addition of catalase which is an enzyme having specific catalytic action for the decomposition of hydrogen peroxide. The addition of any edible readily reducible substance will also give the desired result, e.g. ascorbic acid, isoascorbic acid, and various other antioxidants of a reducing nature. However, catalase and ascorbic acid are preferred since they cause decomposition of the hydrogen peroxide and their presence in the final product introduces no objectionable organoleptic or other properties.

In carrying out the flavor improvement treatment, the soy flour and the treating ingredients are intermixed in aqueous medium or suspension and the mixture is then held or "digested" at a controlled temperature for a limited time. For convenience, the alkaline neutralizing agent when used is usually added to the water first and brought up to the desired temperature. Thereafter, the soy flour, yeast, and oxidizing agent (if used) are added. The mixture is then agitated thoroughly and maintained at a temperature within the range of from about 130° F. to about 180° F. for a period of from about 15 minutes to about 90 minutes. Generally speaking, best results are obtained at a digestion temperature of from about 140° F. to about 150° F. and a digestion period of from about 30 minutes to about 60 minutes. Sufficient water is used to obtain a workable mixture and will usually be from about 75% to about 200% by weight of the soy flour.

When, in accordance with the preferred manner of practicing the invention, the preliminary treatment with sodium bisulfite, sodium nitrite or other reducing agent is included, then it is quite important to provide a period of time for digestion or reaction with the reducing agent prior to the addition of the hydrogen peroxide or other oxidizing agent. Thus, for example, an aqueous solution of sodium bisulfite and ammonium hydroxide may be prepared followed by addition to the soy flour and yeast and allowing the mixture to stand at a temperature within the aforementioned range for a first digestion period. Then the hydrogen peroxide is added and the mixture is subjected to a further digestion period. Finally, after completion of the full debittering treatment, the catalase or ascorbic acid or other reagent for effecting elimination of excess peroxide may be added to the reaction mixture as a final step followed by a brief period of agitation.

Following completion of the treating sequence as described above, the mixture may be dried by drum drying or spray drying or other convenient means to obtain the final debittered soy flour. In the event that the soy flour is to be combined with other ingredients for the preparation of a food product, such as a breakfast food or the like, the additional ingredients may be added to the slurry or digestion mixture at the conclusion of the treating period and the entire composite may then be dried.

In connection with the temperature and reaction time during the digestion period, it is important that these conditions be carefully controlled to avoid alcoholic fermentation and protein hydrolysis or degradation. Generally speaking, the aforementioned temperature conditions are somewhat higher than optimum alcoholic fermentation conditions and the digestion period is much too short for alcoholic fermentation to occur in the presence of the yeast. Thus, the yeast is present entirely for its oxidation-promoting and carbohydrase or other flavor improvement benefits and not for alcoholic fermentation purposes. Similarly, although it is known to treat soy bean protein and other proteinaceous materials with strong alkali and even with yeast autolysate for the purpose of dissolving and hydrolyzing the protein, the present digestion conditions, particularly time and temperature, are not appropriate for any appreciable hydrolysis or denaturation of the protein. The ammonium, calcium, and magnesium compounds in particular have only a mildly alkaline action which, although sufficient for flavor improvement purposes, does not result in dissolution and hydrolysis of the valuable protein content of the soy flour. Likewise, the digestion temperature is too high and the digestion time is too short in the present invention for any significant degree of protein degradation to occur either as a result of alkali action or proteolysis by yeast. Soluble nitrogen and formol nitrogen determinations at various stages of the process show conclusively that these values remain essentially constant at all times thus indicating that no significant degradation of the soy protein occurs.

Merely by way of illustration, the following specific examples of the preferred method of practicing the invention are presented.

Example I

A treating medium was prepared by adding 13.5 gm. of sodium bisulfite and 900 ml. of 1 normal ammonium hydroxide solution to 100 lb. water at 160° F. Fifty pounds of cooked, untoasted solvent extracted soy flour and 25 oz. compressed household yeast (crumbled) was thoroughly mixed with the treating solution. The temperature of the digestion mixture is kept at 140–145° F. in a jacketed kettle for 20 minutes. A solution containing 63.0 ml. of 30% hydrogen peroxide in approximately 500 ml. of water is added to the digestion mixture with thorough agitation. The mixture is then maintained at 140° F. for an additional 20 minutes. A solution of 13.0 ml. catalase in about 500 ml. of water is then added and thoroughly agitated to eliminate any excess hydrogen peroxide. The product may now be drum dried or used as such as a bland flavored soy flour ingredient for further formulation.

Example II

A treating medium was prepared by adding 2 grams of hydrated dolomitic limestone, having a calculated content of 42.2% by weight of calcium oxide and 30.9% by weight of magnesium oxide, to 2 lbs. of water followed by the addition of 1.25 ml. of 30% hydrogen peroxide. One pound of cooked untoasted solvent extracted soy flour was thoroughly mixed with the treating solution and a slurry containing ½ ounce of compressed household yeast was then added to the mixture. The digestion mixture was heated in a jacketed kettle at 140° F. with agitation and maintained at that temperature for 30 minutes. The final product was then dried.

Taste panel tests on the final treated product revealed that the product had an entirely acceptable bland flavor such that it could be readily included as a major ingredient of a food product without any objectionable taste problem.

Example III

On a semi-commercial scale, the soy flour treatment was carried out by adding 9 gallons of water and 114 grams of hydrated dolomitic limestone to a steam jacketed kettle. After heating to 160° F., 63 ml. of 30% hydrogen peroxide were added. In a separate stage, 24 ounces of household yeast was crumbled and mixed with 50 lbs. of cooked solvent extracted soy flour. The mixture of yeast and soy flour was then added to the kettle. The mixture was then thoroughly agitated and maintained at a temperature of 150° F. for 30 minutes. The resultant product may then be drum dried either with or without the addition of other food ingredients to obtain a highly palatable and flavor acceptable final product.

Example IV

A series of tests was conducted in which 100 grams of cooked soy flour in 300 ml. of water was treated with various combinations of treating ingredients including yeast alone, sodium bisulfite alone, hydrogen peroxide alone, ammonium hydroxide alone, yeast and sodium bisulfite, yeast and hydrogen peroxide, yeast and ammonium hydroxide, hydrogen peroxide and ammonium hydroxide, and a combination of all four ingredients. In some instances, a final treatment with catalase was also used. When used, yeast was present at a level of about 3% by weight of the soy flour, ammonium hydroxide 1 N at a level of about 6% by weight of the soy flour, hydrogen peroxide at a level of about 0.3% by weight of the soy flour, sodium bisulfite at a level of about 0.025% by weight of the soy flour, and catalase at a level of about 0.01% by weight of the soy flour.

The procedure in each case was to add the yeast, when used, to the soy flour. The sodium bisulfite and ammonium hydroxide when used were added to the water at 160° F. and the dry ingredients were then mixed in. The digestion was carried out at 140° F. for 20 minutes except that whenever hydrogen peroxide was used it was added after initial 20 minute digestion and the mixture was then held for an additional 20 minutes. This was followed by catalase addition whenever catalase was used. The batches from each test were dried under identical conditions on a drum drier.

Evaluation tests by a taste panel showed the most significant flavor improvement was obtained by treatment with yeast alone, with yeast and hydrogen peroxide, with yeast and sodium bisulfite, with yeast and ammonium hydroxide, and with the combination of all four ingredients. However, the effect of the various treating ingredients is cumulative and most favorable flavor improvement was obtained by the combined use of yeast, hydrogen peroxide, ammonium hydroxide, sodium bisulfite, and catalase.

Example V

The procedure of Example IV was followed using yeast, ammonium hydroxide, hydrogen peroxide, and catalase but sodium nitrite was substituted for sodium bisulfite. The amount of sodium nitrite was about 0.04% by weight of the soy flour. Evaluation by a taste panel showed the sodium nitrite to be as effective as sodium bisulfite as far as flavor improvement was concerned.

Example VI

Tests were made to investigate the role played by yeast in the treating process. Samples of soy flour were digested with yeast, sodium bisulfite, ammonium hydroxide, hydrogen peroxide, and catalase. Formol nitrogen was determined on the diluted gruel and also on the supernatant obtained by centrifuging the diluted gruel. Reducing sugars (calculated as maltose) were also determined on the supernatant. The procedure entailed adding 0.125 gm. sodium bisulfite and 3.0 ml. of 10 N ammonium hydroxide to 2 lb. water. One pound of cooked, untoasted soy flour was added with ½ oz. yeast. The digestion mixture was maintained at approximately 120° F. or 140° F. for various times and then 0.75 ml. of 30% hydrogen peroxide was added and an additional 20 minute rest was allowed. Then 0.25 ml. of catalase was added to eliminate the excess peroxide. Aliquots of the supernatant were taken for determination of reducing sugars and formol nitrogen after 10, 60, and 180 minutes with the following results:

| Treating Conditions | pH | Percent Solids | Percent Formol N | Percent Reducing Sugars |
|---|---|---|---|---|
| 120° F., 10 min | 6.5 | 5.68 | .59 | 32.0 |
| 120° F., 60 min | 6.3 | 5.8 | .81 | 32.0 |
| 120° F., 180 min | 6.2 | 6.03 | .89 | 30.8 |
| 140° F., 10 min | 6.4 | 5.84 | .69 | 33.8 |
| 140° F., 60 min | 6.3 | 6.15 | .88 | 31.8 |
| 140° F., 180 min | 6.1 | 6.47 | .83 | 31.5 |

From the above data it will be seen that yeast produced reducing sugars in substantial amounts and that there was no significant change in formol nitrogen values as the digestion conditions were varied.

Comparative tests at 140° F. and 20 minutes were also made using autoclaved yeast instead of live yeast and diastatic malt syrup or various commercial enzyme preparations instead of yeast. The results of the supernatant analyses were as follows:

| Treating Material | pH | Percent Solids | Percent Formol N | Percent Reducing Sugars |
|---|---|---|---|---|
| live yeast | 6.4 | 4.84 | .80 | 30.7 |
| autoclaved yeast | 6.3 | 4.07 | .82 | 0 |
| diastatic malt syrup | 6.0 | 4.36 | .845 | about 10 |
| Rhozyme P-11 [1] (bacterial protease) | 6.0 | 4.36 | .848 | 0 |
| Rhozyme S [1] (bacterial alpha amylase and protease) | 6.0 | 4.38 | .765 | 0 |
| Rhozyme H-39 [1] (fungal alpha amylase) | 5.8 | 4.48 | 1.05 | 0 |

[1] Commercial enzyme preparation manufactured by Rohm and Haas

These results show quite clearly that only live yeast produces reducing sugars in substantial amounts. Furthermore, a taste panel evaluation showed far greater taste improvement for the yeast treated products as compared with the products obtained by treatment with diastatic malt and the commercial enzyme preparations. Although the soy flour treated with live yeast and the soy flour treated with autoclaved yeast received about equal ratings with respect to blandness or elimination of original objectionable flavors, there were distinct flavor differences. The autoclaved yeast treatment sample was very bland flavored and objectionable flavors were almost entirely missing. The live yeast treated sample on the other hand was more strongly flavored although again no objectionable flavors were present. The indications are that the reducing sugars which are formed by live yeast and not by autoclaved yeast react with protein in the soy flour to produce flavors which are not only desirable but may mask certain objectionable flavors in the soy flour. This reaction of reducing sugars and proteins is known as the "browning" or "melanoidin" reaction.

An investigation was also made to determine if autoclaved yeast still had peroxidase activity. Accordingly, peroxidase determinations were made on yeast autoclaved for 30 minutes at 15 p.s.i. in a 50% yeast–50% water mixture. This autoclaved yeast was tested for peroxidase activity at the standard temperature of 20° C. and standard time of 5 minutes as well as at 55° C. for five minutes and for 20 minutes. The relative activities in terms of mg. of purpurogallin formed during the test periods were:

|  | Mg. |
|---|---|
| 5 minutes at 20° C. | 0.22 |
| 5 minutes at 55° C. | 1.4 |
| 20 minutes at 55° C. | 2.6 |

From the above, it is evident that autoclaving does not entirely destroy the peroxidase activity of yeast and that the amount left is sufficient to yield the favorable results which are obtained. Increasing the time and temperature to approximate those used during digestion, as shown by the above data, increases peroxidase activity by ten fold.

Thus, the beneficial effect of live yeast is believed to be due to peroxidase activity and reducing sugar formation, both of which are desirable for best flavor improvement. The importance of peroxidase activity has also been confirmed more directly by tests using horseradish, which is rich in peroxidase, and certain commercial peroxidase preparations in place of yeast.

I claim:

1. A process for improving the flavor of soy flour which comprises mixing soy flour in an aqueous medium with from about 0.5 to about 8 wt. percent yeast, digesting the mixture at a temperature of from about 130° F. to about 180° F. for a time sufficient to obtain an increase in the reducing sugar content of the soy flour without substantial protein degradation and without alcoholic fermentation, and thereafter reducing the mixture to dryness.

2. A process for improving the flavor of soy flour which comprises mixing soy flour in an aqueous medium with from about 0.5 to about 8 wt. percent yeast, digesting the mixture at a temperature of from about 130° F. to about 180° F. for a period of from about 15 to about 90 minutes whereby to obtain an increase in the reducing sugar content of the soy flour without substantial protein degradation, and thereafter reducing the mixture to dryness.

3. A process for improving the flavor of soy flour which comprises mixing soy flour in an aqueous medium with from about 0.5 to about 8 wt. percent yeast, digesting the mixture at a temperature of from about 140° F. to about 150° F. for a period of from about 30 to about 60 minutes whereby to obtain an increase in the reducing sugar content of the soy flour without substantial protein degradation, and thereafter reducing the mixture to dryness.

4. The process of claim 1 further characterized in that the amount of said yeast is from about 2 to about 6 wt. percent and the digestion temperature is from about 140° F. to about 150° F.

5. The process of claim 1 further characterized in that said mixture also has added thereto, prior to digestion, an oxidizing agent selected from the group consisting of oxygen, ozone, and peroxide compounds and an alkaline compound selected from the group consisting of the alkaline compounds of sodium, potassium, ammonium, calcium, and magnesium.

6. The process of claim 1 further characterized in that said mixture also has added thereto, prior to digestion, from about 0.1% to about 1% by weight of an oxidizing agent comprising a peroxide compound and sufficient alkaline compound selected from the group consisting of the alkaline compounds of sodium, potassium, ammonium, calcium, and magnesium to obtain a pH of from about 6 to about 7.5.

7. The process of claim 6 further characterized in that said peroxide compound comprises hydrogen peroxide and said alkaline compound comprises ammonium hydroxide.

8. The process of claim 1 further characterized in that said mixture also has added thereto, prior to digestion, from about 0.1% to about 1% by weight of an oxidizing agent comprising a peroxide compound.

9. The process of claim 8 further characterized in that said peroxide compound comprises hydrogen peroxide.

10. The process of claim 1 further characterized in that said mixture also has added thereto, prior to digestion, sufficient alkaline compound selected from the group consisting of the alkaline compounds of sodium, potassium, ammonium, calcium, and magnesium to obtain a pH of from about 6 to about 7.5.

11. The process of claim 10 further characterized in that said alkaline compound comprises ammonium hydroxide.

12. The process of claim 10 further characterized in that said alkaline compound comprises limestone.

13. A process for improving the flavor of soy flour which comprises subjecting soy flour in an aqueous medium to the action of an edible non-toxic reducing agent, thereafter mixing the soy flour in aqueous medium with from about 0.5 to about 8 wt. percent yeast, digesting the mixture at a temperature of from about 130° F. to about 180° F. for a time sufficient to obtain an increase in the reducing sugar content of the soy flour without substantial protein degradation and without alcoholic fermentation, and thereafter reducing the mixture to dryness.

14. The process of claim 13 further characterized in that said reducing agent comprises sodium bisulfite.

15. The process of claim 13 further characterized in that said reducing agent comprises sodium nitrite.

16. A process for improving the flavor of soy flour which comprises mixing soy flour in an aqueous medium with from about 0.5 to about 8 wt. percent yeast and a peroxide compound, digesting the mixture at a temperature of from about 130° F. to about 180° F. for a time sufficient to obtain an increase in the reducing sugar content of the soy flour without substantial protein degradation and without alcoholic fermentation, effecting decomposition of excess peroxide compound in the mixture, and thereafter reducing the mixture to dryness.

17. The process of claim 16 further characterized in that said peroxide compound comprises hydrogen peroxide, and decomposition of excess hydrogen peroxide is effected by the addition of catalase.

References Cited in the file of this patent

UNITED STATES PATENTS

| | | |
|---|---|---|
| 1,867,541 | Shellabarger | July 12, 1932 |
| 1,973,281 | Bonotto | Sept. 11, 1934 |
| 2,206,622 | Weizmann | July 2, 1940 |
| 2,524,991 | Renner | Oct. 10, 1950 |
| 2,554,479 | Wolff | May 22, 1951 |
| 2,783,150 | Luther | Feb. 26, 1957 |
| 2,795,502 | Raymond | June 11, 1957 |

FOREIGN PATENTS

| | | |
|---|---|---|
| 10,512 | Germany | Oct. 17, 1879 |
| 35,359 | Netherlands | May 15, 1935 |

OTHER REFERENCES

"Soybeans and Soybean Products," by Markley, vol. 1, 1950, published by Interscience Publishers, Inc. (New York), pp. 358–359.